United States Patent [19]

Williamson

[11] Patent Number: 5,614,066

[45] Date of Patent: Mar. 25, 1997

[54] WATER DISTILLATION APPARATUS

[76] Inventor: William R. Williamson, 8310 Pilgrim Rd., Pensacola, Fla. 32514

[21] Appl. No.: 404,537

[22] Filed: Mar. 15, 1995

[51] Int. Cl.$^6$ .................................. B01D 3/10; C02F 1/04
[52] U.S. Cl. .................... 202/182; 202/185.1; 202/189; 202/197; 202/200; 202/205; 202/237; 203/1; 203/10; 203/11; 203/40; 203/91; 203/DIG. 14; 203/100
[58] Field of Search .................. 203/10, 1, 100, 203/91, 40, 11, DIG. 14, DIG. 17, 197; 202/182, 237, 181, 200, 164, 189, 185.1, 205, 191; 159/DIG. 16; 165/113

[56] References Cited

U.S. PATENT DOCUMENTS

| | | | |
|---|---|---|---|
| 3,219,555 | 11/1965 | Poindexter et al. | 202/194 |
| 3,302,373 | 2/1967 | Williamson | 202/189 |
| 3,922,326 | 11/1975 | Yoshida et al. | 202/158 |
| 4,548,257 | 10/1985 | Williamson | 165/1 |
| 5,259,928 | 11/1993 | Ryham | 202/197 |
| 5,435,891 | 7/1995 | Snitchler | 203/10 |
| 5,464,531 | 11/1995 | Greene | 202/197 |

FOREIGN PATENT DOCUMENTS

| | | | |
|---|---|---|---|
| 0601677 | 2/1960 | Italy | 202/197 |
| 8001108 | 5/1980 | WIPO | 202/197 |

Primary Examiner—Virginia Manoharan
Attorney, Agent, or Firm—George A. Bode

[57] ABSTRACT

An apparatus for converting seawater or other contaminated water into pure water for reuse including: a source of the contaminated water; a first horizontal housing connected to the source of contaminated water and having a heat exchanger therein for vaporizing the contaminated water therein; a vertical housing connected to the distal end of the first horizontal housing for fluid communication therebetween; a second horizontal housing connected at its proximate end to the vertical housing for fluid communication therebetween, the second horizontal housing having a heat exchanger therein for condensing vapor therein; a weir vertically mounted in the first housing for retaining a portion of the contaminated water in the first housing and allowing the other portion of the contaminated water to pass through the heat exchange evaporator from the proximate to distal end of the first housing. Contaminated water in the distal end of the first housing is allowed to pass into the vertical housing and settle therein; vapor in the distal end of the first housing is forced into the vertical housing and rises therein; a mesh filter provided in the vertical housing extracts contaminated vapor from the vapor rising in the vertical housing, the mesh filter being positioned in the vertical housing intermediate the connection of the vertical housing with the first and second horizontal housings. An outlet is connected to the second horizontal housing near the distal end thereof for drawing off the distillate condensed therein.

6 Claims, 3 Drawing Sheets

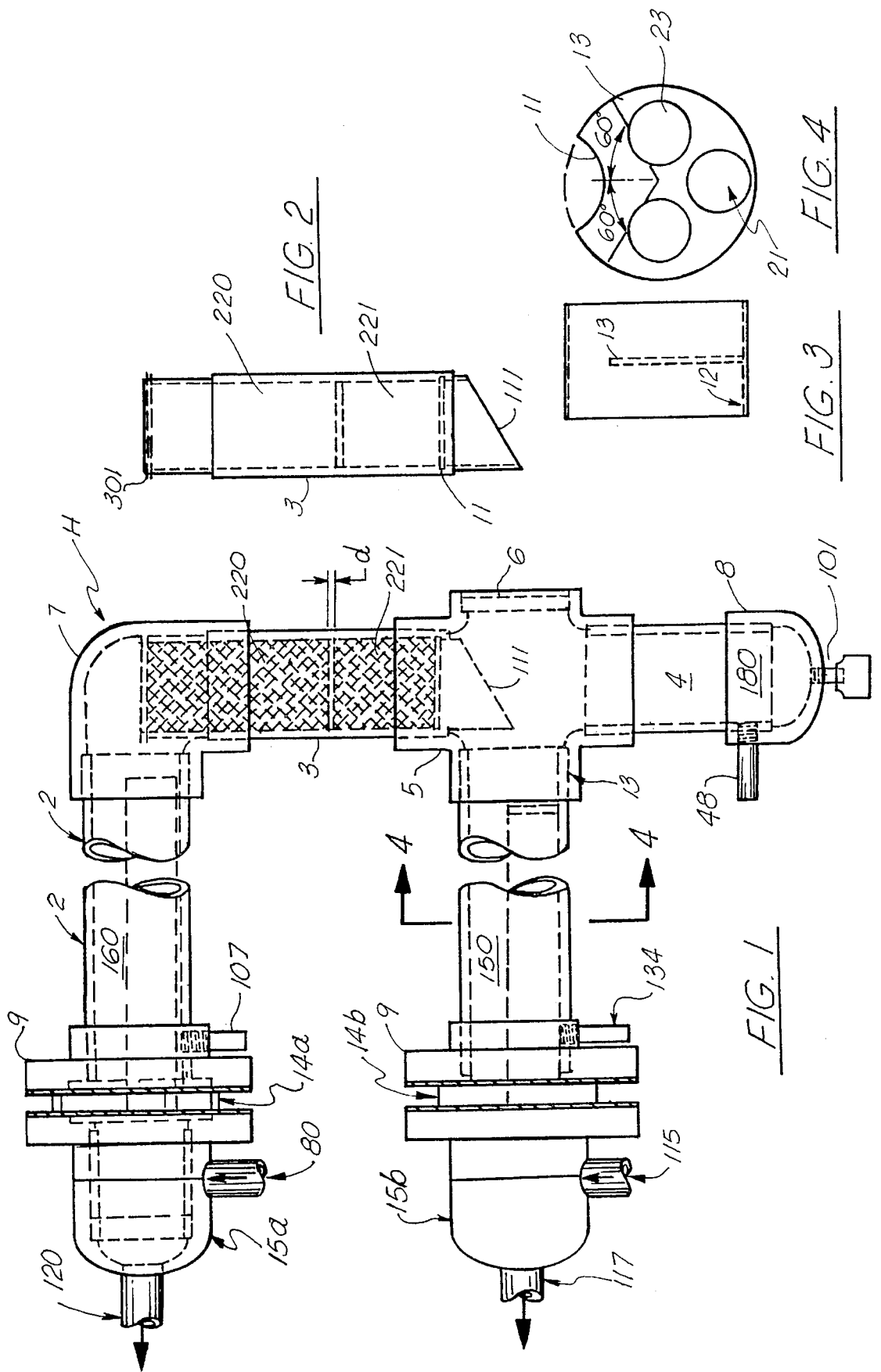

WATER DISTILLATION APPARATUS

BACKGROUND OF THE INVENTION

Field of the Invention

This invention relates in general to distillation units commonly referred to as evaporators employed for several purposes such as converting sea water into fresh water for drinking, recovering metals and chemicals for re-use as in plating operations, removal of toxic or radioactive material or simply to convert by evaporation and condensation, under vacuum, non-potable water into pure drinking water for use in the home, recreation vehicles, small boats, etc.

Previously, sea water distillation units, with the exception of U.S. Pat. No. 3,219,555 issued to Poindexter, et al., have employed expensive copper nickel or monel construction using tightly bent small diameter "U" tube bundles for heat exchangers. Except for Applicant's U.S. Pat. No. 3,302,373, all were dependent on sea water powered eductors to pull vacuum. The high velocity sea water corroded the nozzles and caused back firing into the product water. Applicant's U.S. Pat. No. 4,548,257 (which is incorporated herein as if fully set out herein) disclosed many applications for bayonet tube heat exchanger designs; new applications are disclosed herein. U.S. Pat. No. 3,015,355 issued to Humphrey discloses a twisted enhanced tube applicable to the bayonet tube configuration delineated in one of the embodiments of the present invention.

SUMMARY OF THE PRESENT INVENTION

The preferred embodiment of the apparatus of the present invention solves the aforementioned problems in a straight-forward and simple manner. This invention combines some elements of all four of the aforementioned patents in novel combinations to radically reduce capital costs and combines an evaporator, separator and condenser in a homogenous housing employing low cost, corrosion-resistant standard plastic pipe and fittings. It also provides a low cost heat exchanger constructed of corrosion resistant titanium employing a novel plastic water box and a method of employing interchangeable bayonets to adjust tube velocity for changing flow rates without the need for expensive multi-pass tube arrangements.

The principal objective of this invention is to provide a much less expensive, lighter weight and more corrosion resistant distillation apparatus employing standard PVC and CPVC piping and fittings; in most applications, clear PVC can be utilized to permit viewing of the evaporation, separation and condensation. The heat transfer media is usually light weight corrosion resistant titanium, identical in design for both the evaporator and condenser.

Another object of this invention is to provide a simpler and more reliable method of removing non-condensibles and distilled water under vacuum by recycling the distillate to power an eductor and employing a simple coil in a tank to both cool the distillate and heat the feed water.

A further object of this invention is to provide a means of acquiring optimum velocities in the annulus of the bayonet, e.g., with a 1" O.D.×0.035" titanium sheath, a ½" ips threaded PVC or CPVC pipe for the bayonet will provide an annulus area of 0.125 in$^2$ (whereas standard ⅝" O.D. CPVC tubing with ½" ips adapter provides 0.372 in$^2$ (three times the free area)). A range of 3 to 8'/sec velocity provides optimum heat transfer with permissible pressure drop; therefore 1.25 to 3.12 GPM/tube can be handled with the ½" ips and 3.5 to 9 GPM/tube with the ⅝"OD bayonets provide flexibility in adapting the design to different heat sources and to different enhanced tube configurations such as the Wolverine KORODENSE MHT or the Humphrey twisted tube for the sheath.

Still another object of this invention is to incorporate in the composite housing a brine or concentrate separation system with a sump for removal of the concentrate under high vacuum. Applicant has found that a positive displacement or progressive cavity pump can be employed to extract the brine spilling over from a weir and from the mesh separator by introducing a small portion of cold sea water or raw feed into the suction of the pump. This auxiliary supply serves two purposes; it reduces the net positive suction head required and also provides a steady supply of water since these small magnetic drive pumps cannot run dry. Applicant has also found that troublesome level controls can be eliminated with the use of a weir and variable speed control of the pump; both combine to extract under vacuum the small volume of brine in these relatively small capacity plants.

Many other objects, advantages and features of the invention reside in the construction, arrangement and combination of elements involved in the embodiment of the invention and its practice as will be understood from the following detailed description and accompanying drawing delineating a popular size comprising 3" standard pipe and fittings with a rating of three to five gallons per hour (GPH) of distillate. The 30,000 to 50,000 British Thermal Units (BTUs) of heat can be acquired from the wasted jacket heat of a ten to twenty horsepower engine. Larger engines can be used and only a portion of their waste heat employed. Two inch (2") to six inch (6") plastic pipe and fittings are readily available so capacities can range from 1 GPH to 20 GPH with the low cost advantage of this design. The low initial cost of the design greatly widens the market permitting mass production and radical cost reductions over existing designs.

BRIEF DESCRIPTION OF THE DRAWINGS

For a further understanding of the nature and objects of the present invention, reference should be had to the following description taken in conjunction with the accompanying drawing in which like parts are given like reference numerals and, wherein:

FIG. 1 is a side view (foreshortened in length), partially in section, of the distillation housing of the preferred embodiment of the present invention;

FIG. 2 is a side view of the riser (mist eliminator) of the embodiment of FIG. 1;

FIG. 3 is an enlarged side view of the weir (in phantom) in the evaporator housing member of the embodiment of FIG. 1;

FIG. 4 is a sectional view taken along Line 4—4 of FIG. 1;

DETAILED DESCRIPTION OF THE PREFERRED EMBODIMENTS

Figure 5:
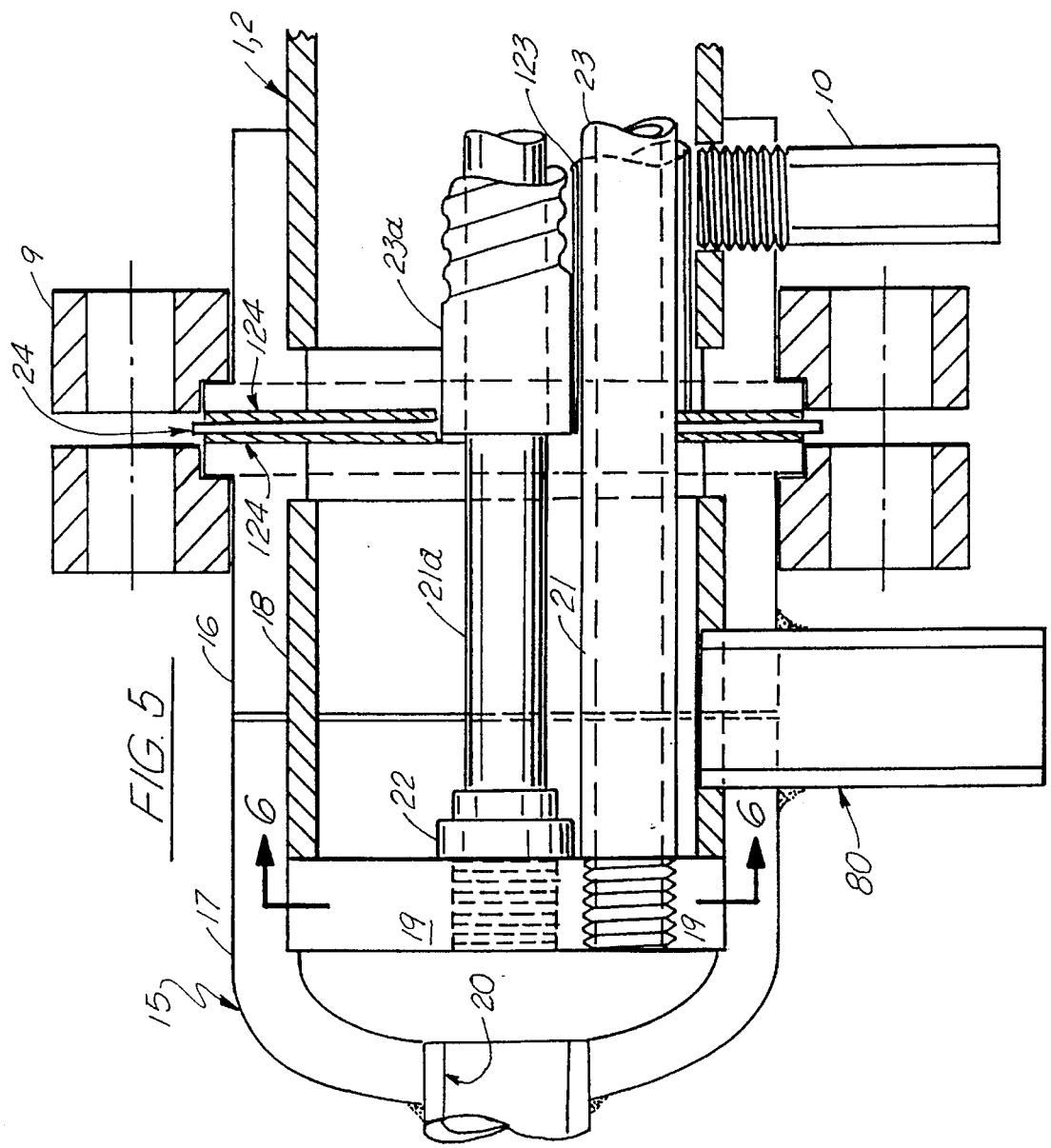
FIG. 5 is a sectional view of the water boxes and a partial section of both bayonet tube configurations.
Figure 6:
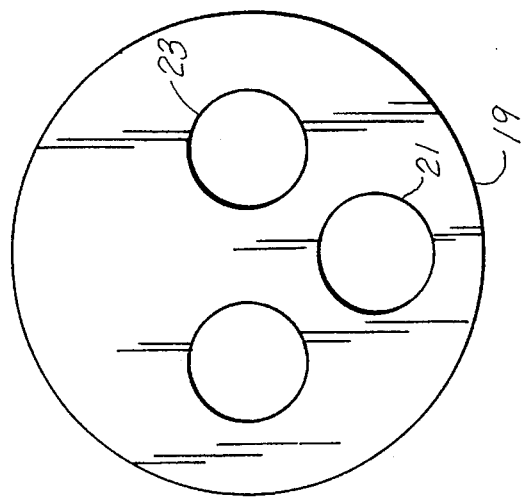
FIG. 6 is a sectional view taken along Line 6—6 of FIG. 5.

Reference will now be made in detail to the preferred embodiment of the apparatus and method of the present invention, examples of which are illustrated in the accompanying drawing.

In accordance with the invention the composite plastic distillation housing H, best shown in FIG. 1, includes pipes 1, 2, 3 and 4 which are standard 3" (nominal pipe size) clear PVC Schedule 40 pipe used respectively to house the evaporation 150, condensation 160, separation 170 and brine collection 180 areas. These four piping sections of suitable length are solvent cemented pipe 1 to pipe 3 and pipe 1 to pipe 4 by a PVC standard cross pipe or tee 5. Pipes 1 and 2 are essentially horizontal and pipes 3 and 4 essentially vertical. The run of cross-piece 5 opposite or at the distal end of pipe 1 incorporates a ½" thick clear PVC sight window 6 solvent welded into the branch of cross 5 which can if desired before-shortened as shown.

Pipes 2 and 3 are joined by solvent welding to a PVC standard elbow 7; pipe 4 terminates in a PVC standard pipe cap 8, solvent cemented to pipe 4.

Pipes 1 and 2 terminated at their opposite ends by being solvent welded to 3" standard PVC flanges 9 preferably of the loose "VAN STONE" type. The heat transfer media and their attendant plastic water boxes 15 as depicted in FIG. 5 are bolted to flanges 9.

Figures 7, 8:
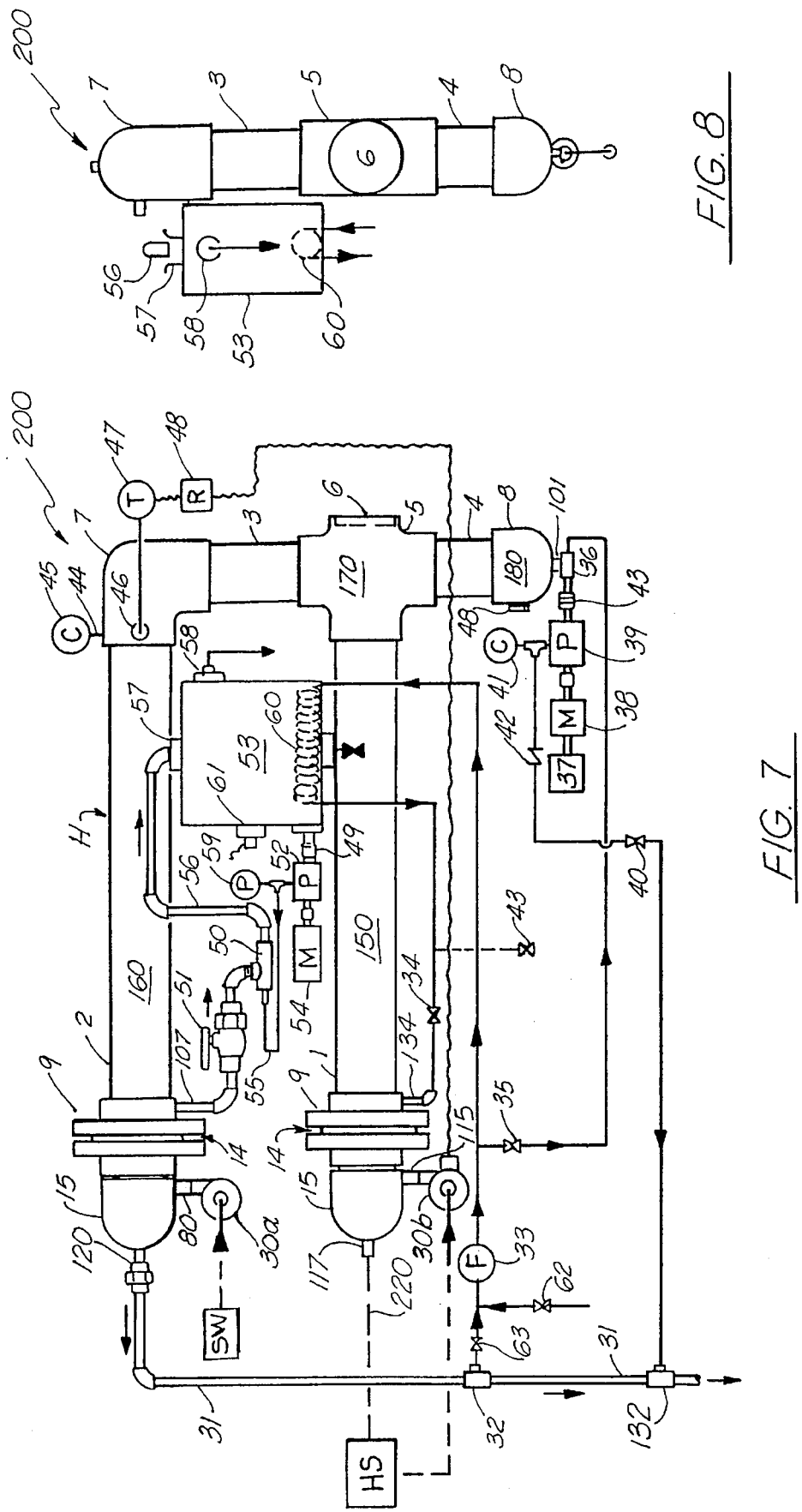
FIG. 7 is a side view diagrammatic illustration of the apparatus and method of the preferred embodiment of the present invention; and, FIG. 8 is an end view of the embodiment of FIG. 7.

Terminal connections as best seen in FIGS. 5 and 7 can be thermo-seal fusion welded to the pipes 1, 2, 3 or 4 but it is usually preferred to take advantage of the double thickness of the fitting connections e.g., at the hub of flange 9 a ½" ips pipe tap can be made which provides a strong threaded connection for a ½" threaded nipple 10 which for additional insurance against vacuum leaks can in turn be solvent welded into the tapped connection of the thicker wall available at the fitting connections.

Referring now to pipe 3 which is best seen in the auxiliary side view of FIG. 2, the ends of pipe 3 have to be turned down by approximately 1/16" for a distance of 2" so that they can slip by the stops in fittings 5 and 7, forming a top dam 301 in the condenser 160 and with a slanted cut, forming a deflector 111 in cross-piece 5 for the brine spilling over the weir 13. The entire assembly is then packed with suitable mesh 220, 221 separated by distance "d", serving as a demister well known in the art. Note the retaining rods 11 in this pipe 3 to retain the mesh demister 220, 221. This assembly is then solvent welded to fittings 5 and 7 to form a leak proof bond, preventing distillate leakage down the mesh 220, 221 and upward brine leakage.

In order to assure a leak proof weir at 13 the distal end of the bayonet sheath 16 of pipe 1, it is preferred to use a sleeve 12 employing standard 3" OD–1/64" wall PVC tubing into which the weir 13 is solvent cemented, as shown in FIGS. 1 and 3. Weir 13 also serves as a tube support. Perforated anti-swash plates (not shown) can be inserted between the weir and tube sheet, if the unit is employed for marine service.

The tube bundles 14 and water boxes 15 are detailed in FIGS. 1 and 5 and encompass simple all plastic. The water box 15a for the condenser 160 in pipe 2 is assembled with standard PVC fittings consisting of a standard "VAN STONE" 3" flange 16, a pipe cap 17, a 3" PVC pipe sleeve 18 and a special PVC tube sheet 19 as detailed w/½" ips drilled and tapped connections, to be inserted and solvent welded into the pipe cap 17 followed by the pipe sleeve 18, also solvent welded into the pipe cap 17. The 3" flange 16 is then solvent welded to the remaining stub end of the sleeve 18. Holes are drilled for 1" PVC pipe nipples 20 which are solvent cemented and then thermo-seal fusion welded as shown (or the holes can be tapped and solvent cemented).

Also seen in FIG. 5 are details of the special plastic bayonets 23 (or the bayonets can be the titanium plain or enhanced sheaths 23a). Standard ½" ips Schedule 80 PVC or CPVC pipe 21, threaded at one end or Schedule 40 or 20 PVC in the condenser 160 with a ½" threaded adapter, can be used for the bayonets with plain sheaths as explained below; or standard 5/8" O.D. CPVC tubing, used in domestic hot water systems, can serve as the insulating bayonet 21a of suitable length fitted at one end with a ½" male adapter, slip×MIPT 22 solvent cemented to 21a.

The tube sheet 14 shown in FIG. 1 is ½" thick so that the titanium sheaths can be roller expanded whereas tube sheaths 23 or 23a as shown in FIG. 5 are welded to a square 1/8" thick tube sheet 24 and the punched out pieces are used at the distal end of the sheath (gaskets 124 ensure a tight seal). This is the preferred embodiment from a cost standpoint since a large 1/8" thick sheet can be punched and the 4¼" pieces then sheared and fitted as shown.

The entire water box 15a is then bolted to flange 9 of the condenser 160 where the true counterflow of the cold water passing through the turbulent annulus 123 condenses the vapor on the outside of the sheath 23, 23a. The insulated bayonets remove the heated water from the inlet vapor (distal) end and reject it back to the ocean, pool, hot tub, domestic hot water or radiator at outlet 120.

An identical water box 15b is used for the evaporator 150 except being all CPVC pipe and fittings to handle heated water provided at inlet 115 to a maximum of 190° F. Again, the hot water flows through the annulus 123 and the most violent boiling occurs at the inlet (proximate) end and the vapor and entrained liquid is swept to the cooler end of the housing 1 where weir 13 is positioned. The insulated bayonets then remove the now cooler water and return it to the engine jacket (not shown) via outlet 117 for further heating or to a solar heater or conventional electric, gas or diesel hot water generator.

Referring now to FIGS. 7 and 8, therein is illustrated the entire distilling apparatus or plant 200 occupying a space of approximately 42" long, 28" high and 10" wide and weighing less than 75 lbs. If the plant 200 must be installed remote from its heating and cooling source then booster pumps 30 might be needed to circulate both services. If booster pumps 30 are required then the ½" ips bayonets should be used to provide about 6 GPM (2 gpm/tube) against usually less than ten (10') feet of head requiring less than one eighth (⅛ hp) horsepower. If the unit is to be connected to a large engine and booster pumps 30 are not required then the smaller bayonet can be employed to get the higher circulation rate which minimizes temperature drop across the heat exchangers and provides a larger temperature gradient for heat transfer across the tube bundles 14.

As previously explained the cooling water is first pumped through the annulus at condenser inlet connection 80 and exits via the plastic bayonet 21 at exit connection 107. The hot water is cooled by the evaporation of the sea water in pipe 1 of evaporator 150 and exits via the plastic bayonets 21 at outlet 117 where it is returned to the heat source HS via line 220 for reheating.

The overboard sea water (exiting at tee 132) is diverted and piped with standard PVC pipe 31 (¾" min.) to tee 32 which branches off to filter and flow meter 33 under control of valve 63 in cold sea waters or 62 from warmer sea waters or separate raw water supply. The feed water then passes through coil 60 in distillate tank 53 under control of needle valve 34 to control the feed rate to about three times the evaporation rate (±15 GPH) cooling the distillate for better eductor performance. This also results in heating the feed water connected at 101 feeding evaporator shell or pipe 1. Needle valve 35 controls cooling water to suction tee 36 if required and should be opened to increase the rate at 33 to about 30 GPH. Speed control 37 adjusts the speed of motor 38 to about 400 RPM for pump 39 and valve 40 is set to show a positive pressure on compound gauge 41; 42 is a check valve. The load on the motor 38 is less than 1/20th HP in driving pump 39 which is a progressive cavity or gear pump. Valve 43 is opened to such in a scale remover, usually citric or other acid; valve 43 can also be used to drain the system into a bucket.

The eductor 50 removes the non-condensibles along with the made distillate collected by pipe 107 from condenser pipe or shell 2. Valve 51 is a single union valve for shut-off when checking for air infiltration and also for hydrostatic testing. Pump 52 takes distillate water suction from tank 53 and is powered by a 1/10th horsepower motor 54 which supplies about one GPM of distillate at about 50 psig through 1/4" hose connection 55 to energize eductor 50 which discharges along with air and distillate through 1/2" pipe or hose 56 to top of tank 53 through open-vented connection 58 to ships storage tank (not shown). A 0–100 psig gauge 59 is connected to discharge of pump 52. An optional conductivity cell 61 is provided in tank 53 to check for purity.

A 1/4" connection 44 is furnished for compound gauge 45. A 1/2" connection 45 is furnished for thermometer 47 and thermostat relay 48 to shut off pump 30b should the temperature exceed 140° F. for protection of the plastic fittings 49 are flexible hose connections to pump suctions 39 and 52.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. An apparatus for converting contaminated water into pure water for reuse comprising:
   (a) a source of said contaminated water;
   (b) a first horizontal housing connected to said source of contaminated water, said housing having first heat exchange means therein for vaporizing said contaminated water flowing therethrough by said first heat exchange means having a counterflow of hotter water in an annulus surrounding the flow of said contaminated water;
   (c) a vertical housing connected at its lower end to the distal end of said first horizontal housing for fluid communication therebetween;
   (d) a second horizontal housing connected at its proximate end to said vertical housing at its upper end for fluid communication therebetween, said second horizontal housing having second heat exchange means therein for condensing vapor flowing therethrough by said second heat exchange means having a counterflow of cooler water in an annulus surrounding the flow of said vapor;
   (e) a weir vertically mounted in the distal end of said first housing for retaining a first portion of said contaminated water in said first housing and allowing another portion of said contaminated water to pass through said heat exchange means for vaporizing from the proximate to distal end of said first housing;
   (f) means for allowing said another portion of said contaminated water in said distal end of said first housing to pass into said vertical housing and settle therein;
   (g) means for forcing under vacuum vapor formed in the distal end of said first housing to pass into said vertical housing and rise there through to said proximate end of said second housing;
   (h) means for extracting contaminated vapor from said vapor rising in said vertical housing; said means for extracting being filter means positioned in said vertical housing intermediate the connection of said vertical housing with said first and second horizontal housings; and,
   (i) outlet means connected to said second horizontal housing near the distal end thereof for drawing off under vacuum distillate condensed therein.

2. The apparatus of claim 1, further comprising means for accumulating said distillate drawn from said second housing.

3. The apparatus of claim 1, further comprising means for collecting solids settling from said another portion of said contaminated water in said vertical housing, said collecting means being in communication with the lower end of said vertical housing.

4. An apparatus for converting contaminated water into pure water for reuse comprising:
   (a) a source of said contaminated water;
   (b) a first horizontal housing connected to said source of contaminated water, said housing having first heat exchange means therein for vaporizing said contaminated water flowing therethrough by said first heat exchange means having a counterflow of hotter water in an annulus surrounding the flow of said contaminated water;
   (c) a vertical housing connected at its lower end to the distal end of said first horizontal housing for fluid communication therebetween, said vertical housing having a sight window therein;
   (d) a second horizontal housing connected at its proximate end to said vertical housing at its upper end for fluid communication therebetween, said second horizontal housing having second heat exchange means therein for condensing vapor flowing therethrough by said second heat exchange means having a counterflow of cooler water in an annulus surrounding the flow of said vapor;
   (e) a weir vertically mounted in the distal end of said first housing for retaining a first portion of said contaminated water in said first housing and allowing another portion of said contaminated water to pass through said heat exchange means for vaporizing from the proximate to distal end of said first housing;
   (f) means for allowing said another portion of said contaminated water in said distal end of said first housing to pass into said vertical housing and settle therein;
   (g) means for forcing under vacuum vapor formed in the distal end of said first housing to pass into said vertical housing and rise there through to said proximate end of said second housing, said means including the lower most portion of said vertical housing, said portion being truncated so as to present a flow diverting barrier to said vapor passing from said first housing to said vertical housing;
   (h) means for extracting contaminated vapor from said vapor rising in said vertical housing; said means for extracting being positioned in said vertical housing intermediate the connection of said vertical housing with said first and second horizontal housings; and,
   (i) outlet means connected to said second horizontal housing near the distal end thereof for drawing off under vacuum distillate condensed therein.

5. The apparatus of claim 4, further comprising means for accumulating said distillate drawn from said second housing.

6. The apparatus of claim 4, further comprising means for collecting solids settling from said another portion of said contaminated water in said vertical housing, said collecting means being in communication with the lower end of said vertical housing.

* * * * *